United States Patent [19]

Bunger

[11] 4,222,347
[45] Sep. 16, 1980

[54] ANIMAL SHELTER FOR LARGE-SCALE FEEDLOT OPERATIONS

[75] Inventor: Richard E. Bunger, Phoenix, Ariz.
[73] Assignee: Corral Industries, Incorporated, Phoenix, Ariz.
[21] Appl. No.: 961,109
[22] Filed: Nov. 16, 1978
[51] Int. Cl.³ .................... F24F 7/02; E04B 7/00; A01K 1/00
[52] U.S. Cl. ........................... 119/16; 52/199
[58] Field of Search .............. 119/15, 16, 19, 20, 119/21, 28; 52/198, 199, 302; 98/32

[56] References Cited

U.S. PATENT DOCUMENTS

| 1,903,510 | 4/1933 | Laboon et al. | 98/32 X |
| 2,549,155 | 4/1951 | Ash | 119/15 |
| 3,556,055 | 1/1971 | Wenger | 119/16 |
| 3,762,372 | 10/1973 | Mente et al. | 119/16 |

FOREIGN PATENT DOCUMENTS

| 24317 | of 1904 | United Kingdom | 119/21 |
| 481302 | 3/1938 | United Kingdom | 98/32 |

Primary Examiner—Louis G. Mancene
Assistant Examiner—Robert P. Swiatek
Attorney, Agent, or Firm—Warren F. B. Lindsley

[57] ABSTRACT

An animal shelter designed specifically for use in large scale feedlot operations, the shelter design facilitating quick and easy conversion or adaptability for seasonal or geographic extremes of weather.

2 Claims, 9 Drawing Figures

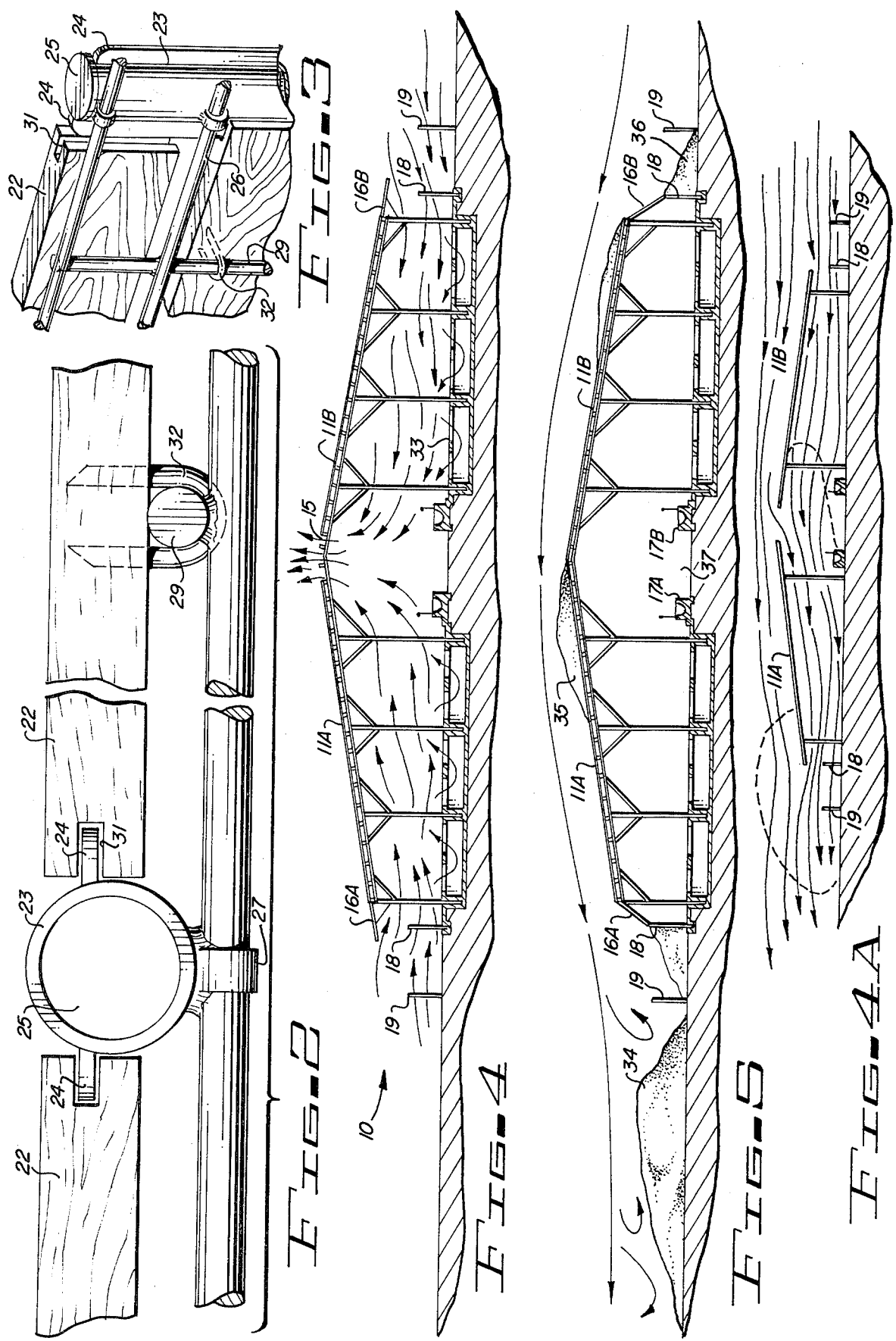

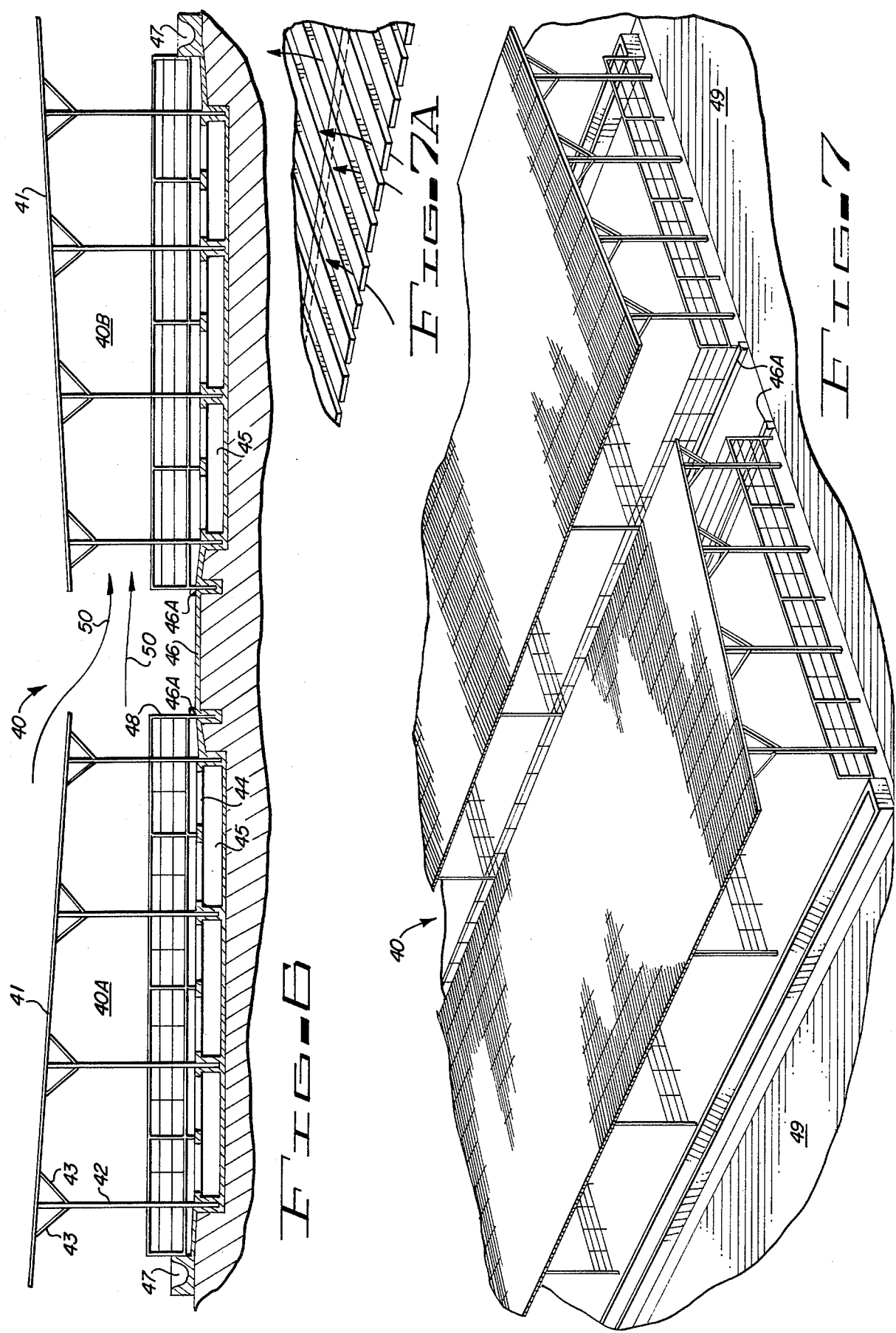

ANIMAL SHELTER FOR LARGE-SCALE FEEDLOT OPERATIONS

BACKGROUND OF THE INVENTION

Because of the rapidly expanding world population and the attendant increase in the demand for food of all kinds, many innovations are being introduced into the cattle fattening industry which has been characterized in recent years by the widespread use of very large scale feedlot operations.

Such operations have been particularly successful because of the high efficiencies achieved in terms of pounds of beef produced per dollar invested in feed and labor. The same careful attention has been given to the design of these lots and associated facilities and equipment that is given to the planning of factory production lines. Automated equipment has been utilized to great advantage for feeding the cattle as well as for cleaning the pens and maintaining a healthful environment for the cattle.

An example of the innovative features incorporated in the designs of these facilities is the slotted floor which permits animal wastes to collect in pits beneath the floors. Frequent cleaning of the pits by means of automatic scrapers in combination with water flushing has significantly reduced odors, insects and other associated environmental and health problems.

The design of the shelter itself and its adaptability to changing weather conditions are especially important considerations, the most difficult problem in this connection involving the provision of adequate ventilation while providing shelter from harsh winds or burning sun and from extremes of temperature. Because of the high concentration of animals in these shelters, the ventilation problem is especially acute and it is important to the health and comfort of the animals as well as to the efficiency of the operation that harmful gases such as ammonia which are generated from the wastes are removed as effectively as possible.

As worthwhile innovations in the design of these shelters are introduced, they have an immediate potential for widespread use in the many new or improved feedlot facilities being put into operation each year throughout the world. For this reason, such improved facilities and equipment have significant monetary value.

SUMMARY OF THE INVENTION

In accordance with the invention claimed, an improved shelter is provided for use in large scale feedlot operations, the shelter having been designed with careful attention given to ventilation and to protection from the elements under varying geographical and seasonal conditions.

It is, therefore, one object of this invention to provide a new and improved shelter for cattle appropriate for use in large scale feedlot operations.

Another object of this invention is to provide in the design of such a shelter a roof configuration which aids in the ventilation of the structure, especially near the floor where the animals breathe.

A further object of the invention is to provide in such a structure a high degree of adaptability to changing seasonal conditions so that additional shelter and protection may be provided as needed against cold weather or more ventilation provided for hot weather.

A still further object of this invention is to provide in such a structure a roof configuration which discourages the collection thereon of drifting snow which might otherwise produce snow loads in excess of the supporting capability of the roof structure.

Yet another object of this invention is to provide a variation of the structure which is especially appropriate in the warmer climates where the chief purpose of the roof is to provide shelter from the sun with a maximum amount of ventilation.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 2 is a top view of a special paneled fence which contributes to the adaptability of the building, the view of FIG. 2 being taken along line 2—2 of FIG. 1;

FIG. 3 is a perspective view of a portion of the fence of FIG. 2, the view of FIG. 3 being taken at circled area 3 of FIG. 1;

FIG. 4 is a cross-sectional view of the shelter of FIG. 1 taken along line 4—4 of FIG. 1, the view of FIG. 4 showing air-flow through the structure with maximum ventilation provided.

FIG. 4A is a cross-sectional view similar to FIG. 4 of the shelter of FIG. 1 showing slow air motion through the structure.

FIG. 5 is a cross-sectional view of the shelter of FIG. 1 taken along line 5—5 of FIG. 1, the view of FIG. 5 showing ventilating flaps closed for protection against a blowing snow storm.

FIG. 6 shows a side view of a second embodiment of the invention in the form of an animal shelter which is especially suited for use in hot climates.

FIG. 7 is a perspective view of the structure of FIG. 6.

FIG. 7A is a partial view of the roof of the structure shown in FIG. 7 illustrating its slotted configuration and airflow characteristics.

DESCRIPTION OF THE PREFERRED EMBODIMENT

Figure 1:
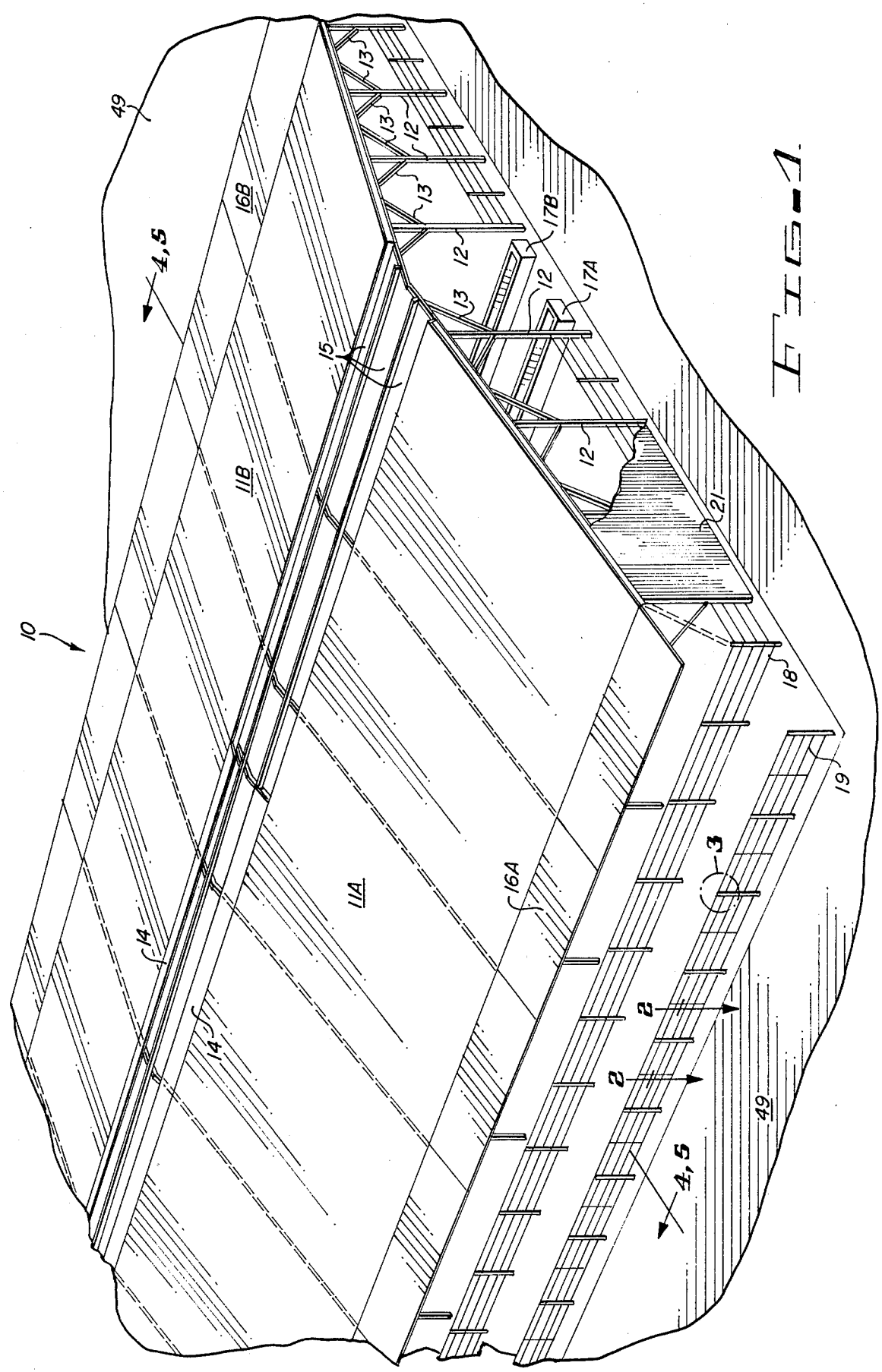
FIG. 1 is a perspective view of the disclosed animal shelter in a first embodiment which provides adaptability to hot or cold weather conditions.

Referring more particularly to the drawing by characters of reference, FIG. 1 discloses the animal shelter 10 specifically designed for use in large scale feedlot operations, the shelter 10 comprising two main rectangular roof sections 11A and 11B, each sloping at a relatively low pitch upwardly toward the center of the structure and supported by a plurality of posts 12. Each post 12 is stiffened by a pair of diagonal braces 13 wedged between posts 12 and the underside of roof sections 11A and 11B. Removable louver covers 14 are positioned over slotted openings 15 at the peak of the shelter running along the intersection of roof sections 11A and 11B with hinged ventilation flaps 16A and 16B attached along the outer lower edges of roof sections 11A and 11B. Two feeding troughs 17A and 17B extend the length of the building, one under each of the upper edges of roof sections 11A and 11B. A tubular steel fence 18 extends along both ends of the shelter and along the two opposite sides of the building a few feet beyond the lower edges of roof sections 11A and 11B. A second fence 19 is arranged parallel with each of the sides of the building and positioned ten to fifteen feet farther away from the outer edges of roof sections 11A and 11B. Similar fences within the building serve to divide area into animal pens. Siding 21 covers the ends of shelter 10, as shown in FIG. 1.

As shown in FIG. 1, shelter 10 is adaptable for relatively hot or cold temperature conditions by means of the louver covers 14 and flaps 16A and 16B. Covers 14 may be removed to open louvers 15 and in combination with the opening of flaps 16A and 16B in hot weather control the ventilation of the shelter. The covers and flaps may be closed or partially closed in cold weather to control the ventilating condition of the shelter. If desired, removable fence panels 22 may be installed on fences 18 and 19 in cold weather to serve as a wind break and barrier and easily removed or partially removed in hot weather for increased ventilation.

Although the design features of fences 18 and 19 may be of any suitable configuration for quick and easy removal or replacement of panels 22, FIGS. 2 and 3 illustrate the use of a vertical tubular steel post 23 which has two vertical ribs or fins 24 attached at opposite sides of the post and lying in a plane which is parallel with the length of the fence. A cap 25 covering the top of post 23 is provided to keep out water and prevent rust. Horizontal tubular steel rods 26 run between adjacent posts and are located one above the other and spaced evenly between the top and bottom of the post at a separation of a foot or less. The rods are reinforced by encircling steel bands 27 which are welded as shown to posts 23. One or more vertical tubular steel rods (or slats) 29 are located between adjacent posts 23 and welded to horizontal rods 26 at intersecting points of contact. The removable wooden panels 22 are provided with vertical slots 31 at each end with the slots being dimensioned appropriately to fit over the fins 24 of posts 23. The slots 31 and fins 24 cooperate to support panels 22 by fins 24 and permit the installation or removal of the panels 22 from between the posts 23 by insertion at the tops of the posts. To prevent theft of the panels and minimize warpage they may be lightly secured in position by means of staples 32 which straddle vertical stays (or rods) 29 and penetrate the wooden panels 22. It should be noted that the rods 26 and posts 29 may be positioned on either side of the panels 22.

Ventilating airflow patterns for shelter 10, as configured for hot weather, are shown by the arrows in the cross-sectional view of FIGS. 4 and 4A.

With flaps 16A and 16B raised and panels 22 removed from fences 18 and 19 and louver covers 14 removed from openings 15, the shelter is adaptable for relatively hot weather. Hot air inside the shelter rises along the sloping undersides of roof sections 11A and 11B moving toward the centrally located openings 15 at the peak of the roof structure. This action creates an updraft at the center of the shelter as shown in FIG. 4 for rapid air movement which draws fresh air into shelter 10 from both sides thereof. The fresh air flows under the raised flaps 16A and 16B and into the shelter moving upwardly to be exhausted through louvers 15. Because of the low pressure center thus created over the heads of the cattle or other sheltered animals, hot air also rises from beneath the slotted floor 33 causing fresh air to be drawn under the floor thereby enhancing the ventilation or exchange of air under the animals close to the floor where the animals breathe. In more conventional structures, the air along the floor is stagnant or at best poorly ventilated. Scraper pit effectively positions animals 2½ feet above pit floor which promotes better circulation around animals since slats of flooring do not significantly restrict slow air movements.

The ventilation of the building is aided in the presence of a moderate breeze blowing across the roof by virtue of the special roof configuration. As air moves from left to right in FIG. 4, for example, over roof sections 11A and 11B, air velocity is increased at the peak of the structure over louvers 15 because of the venturi effect produced by the upward slopes of roof sections 11A and 11B toward the apex at the center. As in any venturi, the high velocity in the area of reduced cross-sectional area is accompanied by reduced pressure. In this case, the reduced pressure point is located just over the louvers 15 as appropriate to enhance the ventilation of shelter 10.

Ventilation air flow patterns are influenced by the rate of movement of the air. For example, slow air motion draws air on through louvers 15 since downwind low pressure becomes stronger than the venturi effect described above as shown in FIG. 4A. Air flow pattern flowing inward from both sides of the building insures an adequate supply of fresh air to both sides, this being in contrast to the flow pattern of a shelter which depends upon air entering at one side only and exhausting at the other in which case the air may be excessively stale along the exhaust side. The structure can be configured to best utilize dominant seasonal windflow velocities, temperatures and directions.

In the cross-sectional view of FIG. 5 in which shelter 10 has been conditioned for winter, louver 15 is partly covered, and if fences 18 and 19 are used, panels 22 are installed thereon as heretofore explained. Flaps 16A and 16B are lowered to reduce cold drafts inside shelter 10 thus providing added protection against cold, wind and snow. Fences 18 and 19 cooperate with the sloping roof sections 11A and 11B and encourage the collection of snow 34 along fence 19 and consequently minimize the collection of snow 35 of the roof of shelter 10. Because of the gentle pitch angles of the roof snow remains airborne or is picked up from the roof surface as the wind blows from right to left over roof sections 11B and 11A. As the airborne snow passes over the lower edge of roof section 11A, the air expands downwardly and the accompanying decreased pressure and downward swirling air patterns cause snow to be deposited in drifts 36 between fences 18 and 19. In addition, the drag created by fence 19 produces turbulence and downwardly swirling air patterns which cause a great deal of snow to be deposited in drifts 34 beyond fence 19 before it has a chance to be carried toward another shelter adjacent shelter 10.

The advantage of the location of feeding troughs 17A and 17B in the center of the building with a central service aisle 37 is especially apparent in FIG. 5.

Such an arrangement allows access to troughs 17A and 17B under all weather conditions. Additionally, in the summer it prevents excess collection of rain water in troughs 17A and 17B as would likely occur if the troughs had been located along the outside of the enclosure.

A second embodiment of the invention in the form of a warm-weather shelter 40 is shown in FIGS. 6 and 7. The shelter 40 is intended for use in hot climates where there is no need to provide protection against cold weather and is accordingly, a considerably less expensive structure.

Shelter 40 is comprised of two sections; 40A and 40B. Each section has a flat, gently sloping roof 41 supported by posts 42 with diagonal braces 43 and is built over a slotted or flume floor 44 and waste collection pit 45. A raised service alley 46 flanked by curbs located between sections 40A and 40B slopes downwardly toward the ends of the shelter to direct rain water away from pens. Roof support posts 42 are anchored in the concrete structure of the slotted floor 44 and pit 45.

The roof 41 of each structure slopes upward from its low point in the center of shelter 40 to a high point at the side of the shelter. Running lengthwise along each side of shelter 40 under the high edge of roof 41 is a poured concrete feeding trough 47. Cattle are contained within sub-sections of sections 40A and 40B by steel fencing 48 which runs along both edges of raised floor 46 and crosswise between floor 46 and trough 47.

The configuration of the roof 41 as it slopes upwardly and outwardly from the center of the structure is advantageous from two aspects:

First, in rainy weather drainage is toward the center, the water running off roof 41 onto raised floor 46 from which it is directed to suitable runoff ditches and eventually to a runoff pond from which appropriate quantities are reused to flush or clean the scraper pits or dilute the manure for processing. Feed trough 47 by virtue of its location under the high point of the roof at the outside of the shelter is not subject to flooding by water running off the roof. Because water running off the roof is collected and directed into cattle lane 46 with water containing curbs 46A, excess flooding of the surrounding yard area 49 is prevented and the problem of maintaining solid footing in these areas for service trucks and feeding is materially reduced.

Second, the upward and outward slope of the roof 41 enhances the ability of shelter 40 to make the best use of available cross winds or breezes for ventilation. Arrows 50 indicate air flow through the structure in the presence of such a cross wind. The venturi effect produced by the reduced cross section under the roof 41 in the center of the building produces a low pressure area in the center which tends to draw in fresh air for the section 40B which happens to be down wind as shown in FIG. 4. In still air, the fresh air enters shelter 40 at the center through the opening between the two roofs 41 and flows outward and upward toward the outside as shown in FIG. 4A. In either case, i.e., in the presence of a breeze or in still air, at least a part of the air supplied to sections 40A and 40B is fresh air drawn in at the center.

Two variations of an animal shelter have thus been disclosed, both of which utilize roof configurations and other features which adapt the shelter to changing seasons or to specific climatic conditions. While the two embodiments of the invention take different approaches to meeting specific requirements involving ventilation and drainage, both utilize the same principles and techniques, i.e. large air capturing openings and strategically located vents for controlling air flow.

It should be recognized that an important feature of this invention is the diffusion effect of the claimed structure on high velocity winds and rain. Further, the structure causes water run off to be handled without diluting the feed of the animals or destroying the system of waste removal.

Although but two embodiments of the present invention have been illustrated and described, it will be apparent to those skilled in the air that various changes and modifications may be made therein without departing from the spirit of the invention or from the scope of the appended claims.

What is claimed is:

1. A feedlot shelter for confined animals employing improved ventilating means for controlling air movement within and over its outer periphery to compensate for ventilating needs of the animals within and seasonal conditions without comprising:

at least a pair of substantially identical isolated roof sections spacedly positioned from each other a predetermined distance to provide a limited space therebetween, each roof section sloping upwardly toward each other, louvered means mounted on said roof sections for cooperatively controlling the air flow through said space and the destructive effects of wind blown rain and snow on the contents in said shelter, said roof sections each being spacedly mounted over an animal confinement pen built over waste collecting pits, each confinement pen having a slotted floor for collecting the wastes in the pits below extruded by the animals confined in the pen above, said roof sections being spaced close enough together to cooperatively provide between juxtapositioned first sides thereof a vent centrally positioned therebetween for aiding air movement within said pens and between said roof sections, feeding troughs positioned adjacent said pens underneath the high point of each sloping roof section, and means for enclosing the sides of said shelter between the top of the pens and said roof sections, a part of said means being selectively movable to open parts of the sides of said shelter for controlling the air flow through said central vent, said means comprising portions hingedly connected on the other sides of said roof sections spaced from said vent for variably controlling the air flow through said vent.

2. The feedlot shelter set forth in claim 1 in further combination with:

fence means juxtapositioned from said enclosing means for cooperating with said roof sections for collecting and directing drifting snow blown over said roof sections when said central vent means are partially closed.

* * * * *